June 28, 1960    J. M. LUKER    2,942,284
PAN WASHER

Filed Feb. 27, 1958    8 Sheets-Sheet 1

INVENTOR.
JACKSON M. LUKER
BY
J. Warren Kinney Jr.
ATTORNEY

June 28, 1960

J. M. LUKER 2,942,284

PAN WASHER

Filed Feb. 27, 1958

INVENTOR.
JACKSON M. LUKER
BY
J Warren Kinney Jr.
ATTORNEY

INVENTOR.
JACKSON M. LUKER
BY
ATTORNEY

INVENTOR.
JACKSON M. LUKER

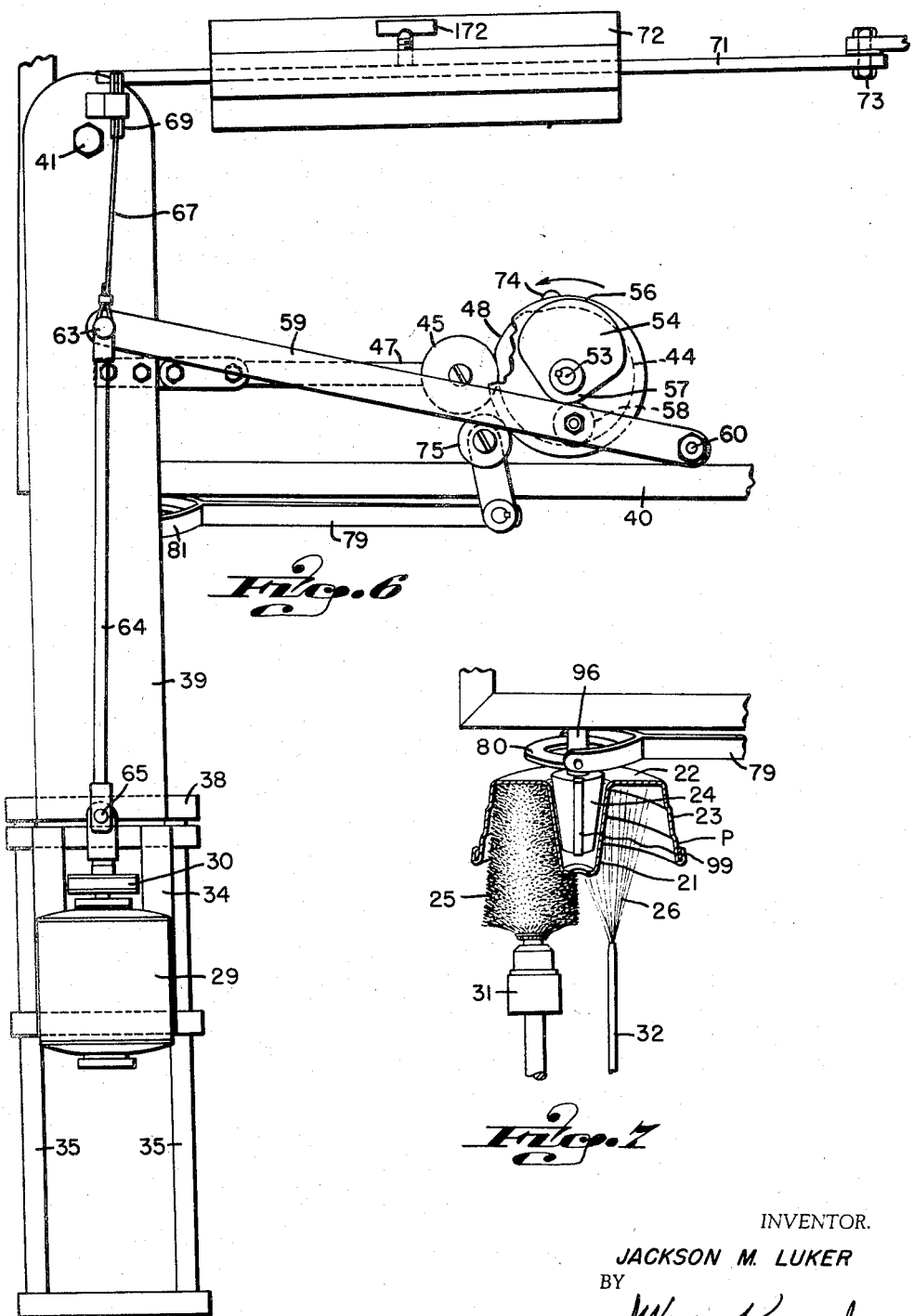

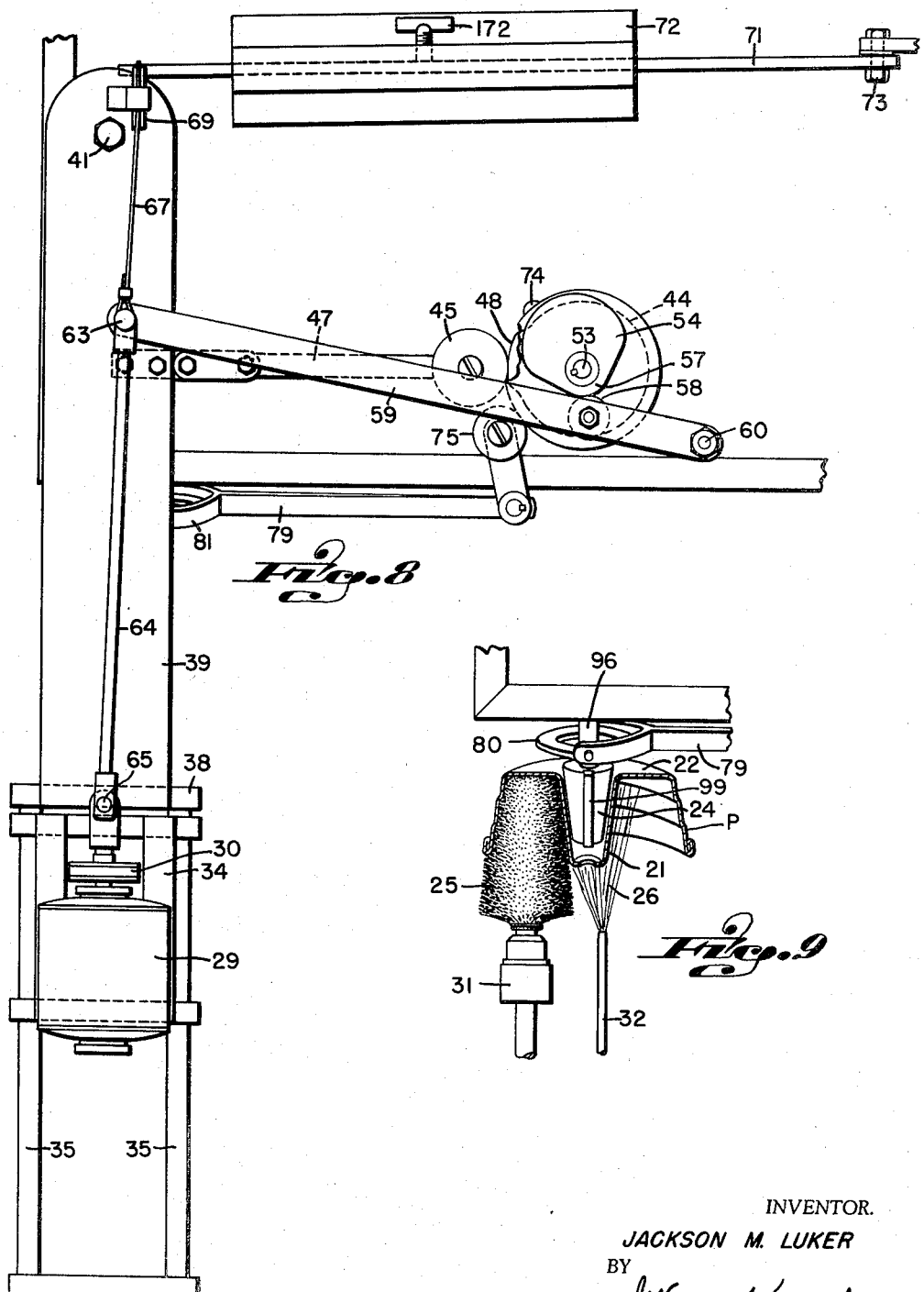

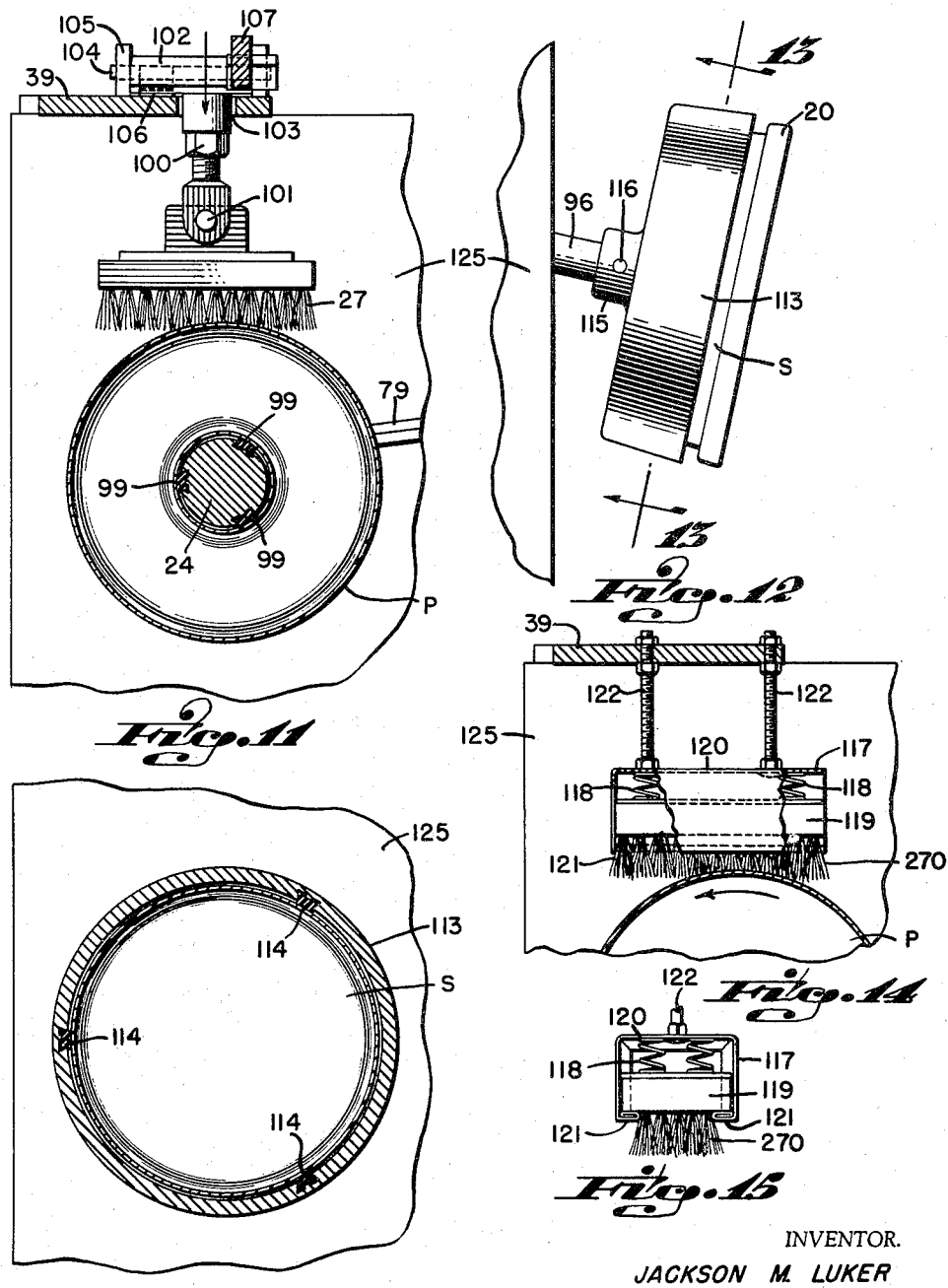

INVENTOR.
JACKSON M. LUKER
BY
J. Warren Kinney, Jr.
ATTORNEY

United States Patent Office 2,942,284
Patented June 28, 1960

2,942,284

PAN WASHER

Jackson M. Luker, 114 W. Main St., Urbana, Ill.

Filed Feb. 27, 1958, Ser. No. 717,879

19 Claims. (Cl. 15—56)

The present invention relates to a bake pan scrubber, purpose of which is to remove encrusted batter, dough, grease, or the like from baking pans to prepare them for repeated use. The device of the invention is adapted particularly for scrubbing or washing deep pans of the type used in the baking of cakes, with or without a central hole formed by a tube built into the pan. Deep pans, unlike shallow pans, involve a cleaning operation which is complex and laborious, and consequently expensive of performance.

An object of the invention is to provide an improved apparatus for the cleaning of deep baking pans automatically at a rapid rate, and with great savings of time and labor.

Another object is to provide apparatus for the purpose stated which is durable and highly serviceable, as well as economical of operation.

A further object is to provide an automatic pan scrubber which is thorough in the performance of the scrubbing operation, thereby eliminating the need for subsequent inspection and handling of the pans.

Another object of the invention is to provide a mechanical pan scrubber of improved design, which is simple to operate and maintain, and the working parts of which are exceptionally free of wear and breakage.

The foregoing and other objects are attained by the means described herein and illustrated upon the accompanying drawings, in which:

Fig. 6 is a schematic top plan view illustrating certain parts in position to initiate the first step of the operating sequence.

Fig. 7 is a fragmentary cross-sectional view illustrating the relationship of a pan to a scrubbing brush during the first step of operation.

Fig. 8 is a view similar to Fig. 6, illustrating certain parts in position to initiate a second step of the operating sequence.

Fig. 9 is a view similar to Fig. 7, illustrating the pan and brush relationship during the second step of operating sequence.

Fig. 11 is a fragmentary cross-sectional view taken on line 11—11 of Fig. 5.

Fig. 12 is a detail side elevational view showing an arbor in modified form, to support a tubeless deep pan for cleaning.

Fig. 13 is a cross-sectional view taken on line 13—13 of Fig. 12.

Fig. 14 is a detail cross-sectional view of a modified form of scrubbing brush operating upon a bake pan to be cleaned.

Fig. 15 is an end view of the brush and mounting therefor illustrated by Fig. 14.

Figure 1:
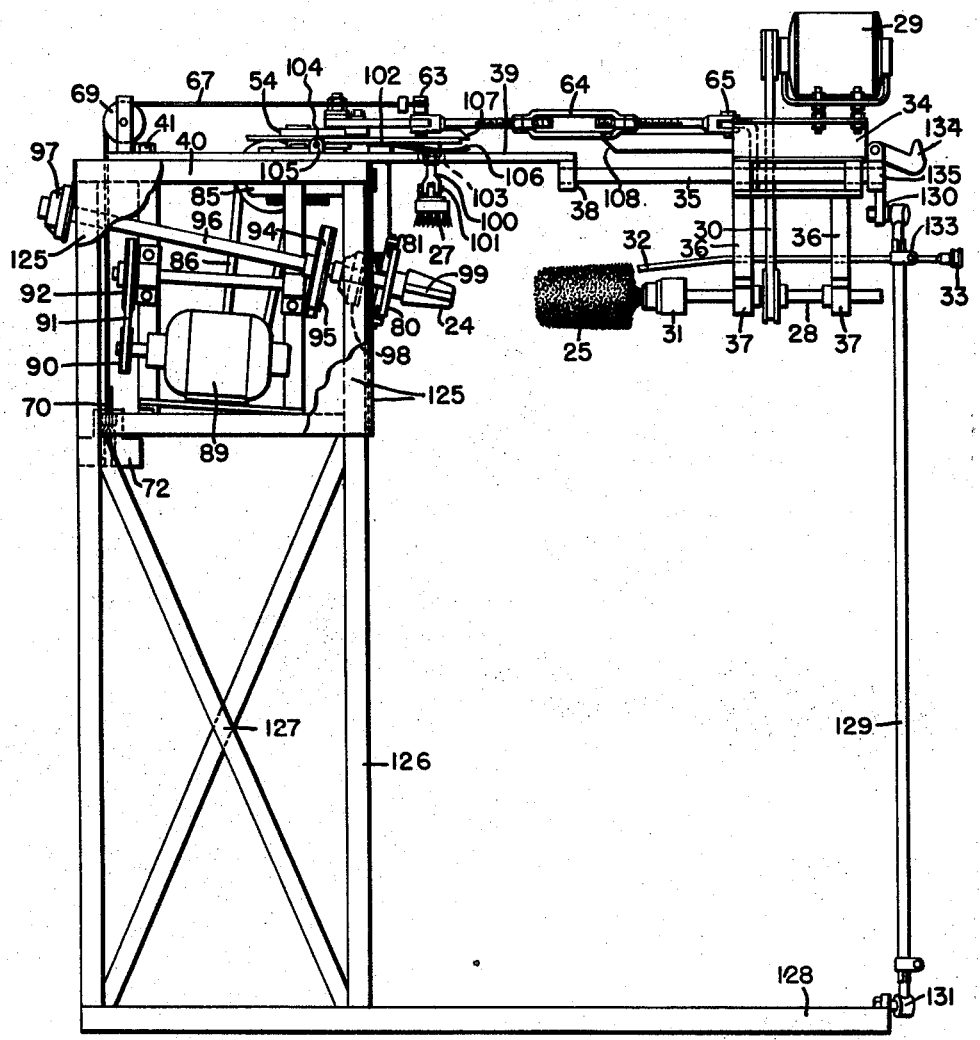
Fig. 1 is a side elevational view of the improved bake pan scrubber embodying the invention, part of a cover panel being broken away to show interior structure.

Representative forms of the relatively deep baking pans to be cleaned or scrubbed are shown at P, Fig. 7, and at S, Figs. 12 and 13. Pan S is a circular flat-bottomed pan with outwardly flared sides terminating in an annular roll or bead 20. The bottom of pan S is plain, or imperforate, and may be called a tubeless pan.

The pan P is distinguished from pan S, principally in that it has a central hollow tube 21 upstanding upon the pan bottom 22, concentrically with the pan side wall 23. The side wall flares outwardly toward the top, as usual, and may be either plain or stepped as shown. The central tube 21 is conical, with its side wall diminishing in size toward the top of the pan. The apparatus of the invention includes means preferably in the form of frictional grippers, to hold either type of pan in the course of the scrubbing or cleaning operation.

In accordance with the invention, a pan such as P is supported upon a mandrel 24 for rotation concentrically with the mandrel, and a scrubbing element such as a rotating brush 25 is plunged into the pan against the bottom wall thereof. Also at this time, a cleaning liquid such as a stream of water 26 is directed into the pan interior, and an outside scrubbing element such as brush 27 is brought into contact with the exterior face of the pan side wall, for cleaning said exterior face.

With the use of means to be described, the rotary brush 25 is first biased laterally (Fig. 7), to bear heavily against the central tube 21 to effectively scrub the tube for a brief period of time, and then the same brush is biased in the opposite direction to bear heavily against the inner face of the side wall 23, Fig. 9, to effectively scrub the inner face of the side wall for a brief period of time. During the entire scrubbing operation, both the pan and brush 25 are rotating, preferably in opposite directions, and cleansing fluid is supplied thereto.

The final steps of the operating sequence involve retraction of both brushes from the pan, followed by an automatic displacement of the scrubbed pan from the rotating mandrel. An attendant stationed at the apparatus receives and stacks the displaced clean pans and places soiled pans upon the mandrel in rapid succession.

As illustrated by Fig. 1, the rotary brush or scrubber 25 is securely fixed to a drive shaft 28 rotated by means of an electric motor 29. The motor may drive the shaft at a required speed either by means of a direct drive, or through the agency of a belt drive shown at 30. For convenience in replacing worn scrubbers, the shaft 28 may be furnished with a chuck 31 to grip one end of the scrubber element. The character 32 indicates a tube for conveying water or other cleansing fluid from a source of supply 33 to the scrubber 25, as indicated at 26 upon Fig. 7.

Figure 2:
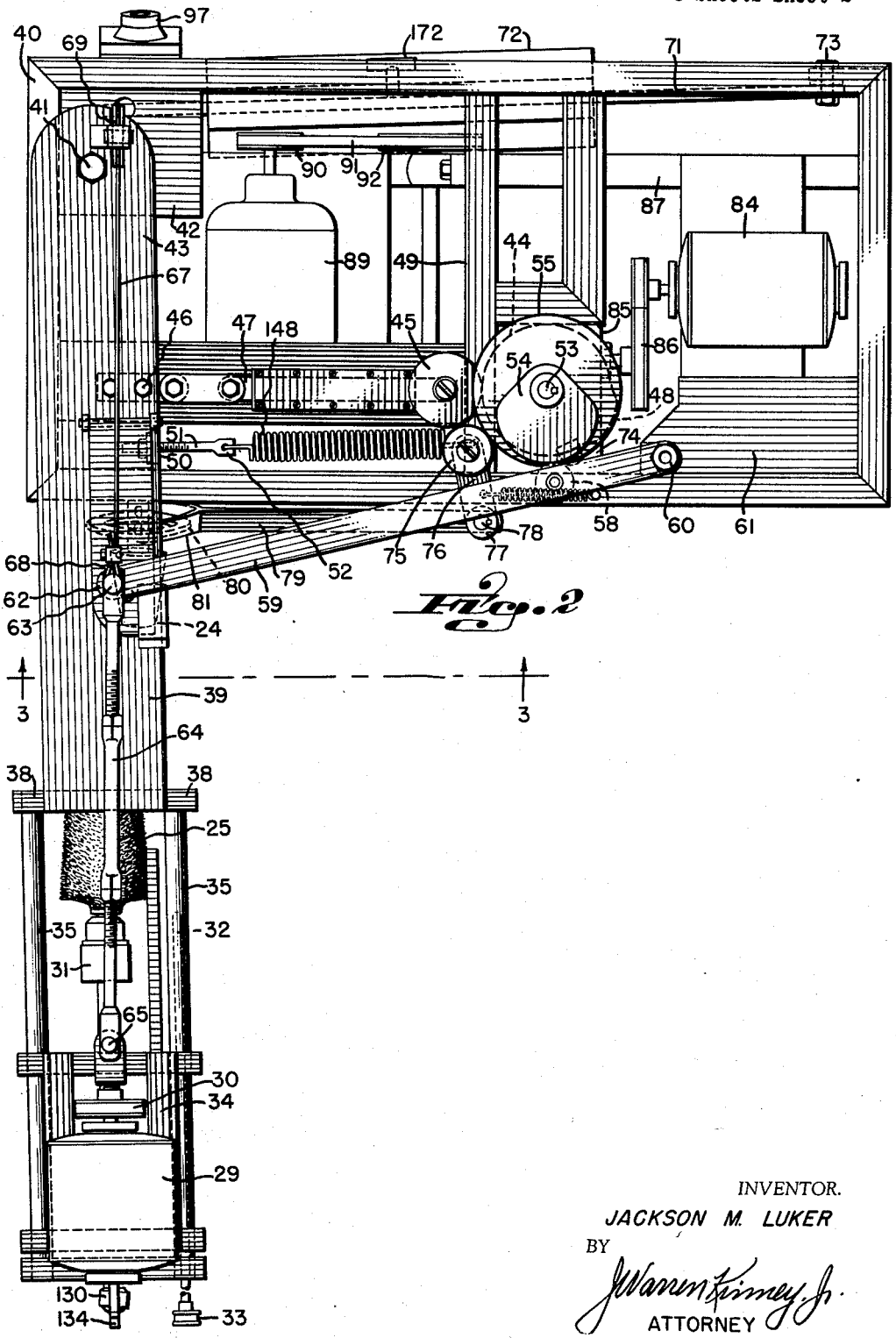
Fig. 2 is a top plan view of the device.

Motor 29 may be mounted upon a carriage 34, for movement along a rail or track 35 which is parallel to the scrubber drive shaft 28, and from the carriage may depend a pair of shaft hangers 36 carrying bearings 37 for said shaft, the arrangement being such that reciprocatory movements of the motor carriage along the rail 35 will advance and retract the scrubber 25 relative to mandrel 24 and any pan supported thereon. The rail or track 35 has one end thereof fixedly supported at 38 upon a beam 39, which beam is horizontally disposed for slight shifting movements laterally, to swing the motor carriage 34 and the scrubber 25 suspended therefrom, to and from the cleaning positions of Figs. 7 and 9. Beam 39, in order to have lateral movement as stated, may be pivoted upon frame top 40 by means of an upright pin or bolt 41. The top of the frame may carry a fixed plate 42 serving as a support for the pivoted end 43 of beam 39. Fig. 2 shows beam 39 biased slightly to the right about its pivot 41. Fig. 8 shows the beam swung toward the left, relatively.

By referring to Fig. 2, it will be understood that mandrel 24 would support a pan in position for entry of scrubber 25, upon shifting of carriage 34 toward the mandrel. The scrubber then could be bodily shifted to the right, and to the left, by merely swinging the beam 39 slightly about its pivot 41, to place the rotating scrubber in position to bear upon the tube of the pan, or the inner face of the pan side wall, as shown in Figs. 7 and 9, respectively.

The means for so swinging the beam 39 about its pivot 41, may comprise a rotary cam 44, Fig. 2, the periphery of which is in contact with a cam follower 45 having connection with the beam at 46, preferably by means of an adjustable link 47. When the high point or toe 48 of cam 44 strikes the cam follower 45, the link will move to the left, Fig. 2, causing movement of beam 39 in clockwise direction about its pivot 41. When the high point of cam 44 leaves the follower 45, the follower and its link 47 together with beam 39, are moved to the right by the force of a heavy tension spring 148 anchored to a stationary frame member 49 and to the beam at 50. The connection at 50 may include an adjusting screw 51 anchored to beam 39, and having a head 52 to which an end of the spring is secured.

The shaft 53 which carries cam 44 carries also two other cams 54 and 55. Cam 54 is one which controls the movements of motor carriage 34 and the rotary scrubber 25 carried thereby. That is, the function of cam 54 is to advance and retract the rotary scrubber 25 relative to a pan to be cleaned. It will be noted that cam 54 has a toe 56 and a heel 57 upon which may ride a follower 58. The follower may be a roller carried by a carriage shifter arm 59, one end of which is pivoted at 60 upon a stationary part 61 of the machine frame, and the opposite end 62 of which arm is pivotally connected at 63 to an adjustable tie rod 64. The tie rod 64 connects the shifter arm 59 to the motor carriage 34 at 65, where a pivotal connection is provided.

Referring to Fig. 2, it will be understood that clockwise movement of shifter arm 59 about its stationary pivot 60, will be accompanied by advancement of motor carriage 34 and the scrubber 25, toward the mandrel 24 and any pan that may be located upon the mandrel. Movement of arm 59 in the opposite direction will, of course, retract the carriage and scrubber 25, through the action of tie rod 64.

Figure 4:
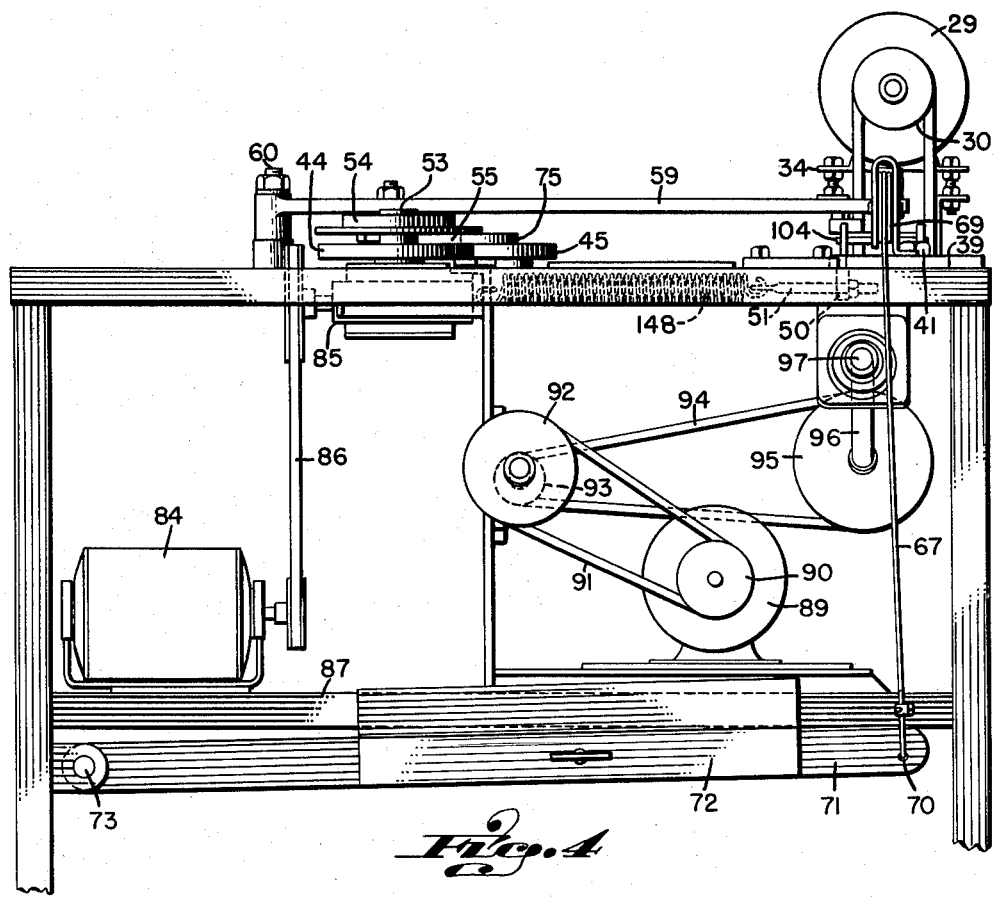
Fig. 4 is a rear elevational view of the apparatus, with the lower portion of the frame broken away.

The motor carriage 34 is constantly yieldingly urged toward the mandrel 24. Means for this purpose may include a cable 67 having an end 68 anchored to pivot 63, the cable being trained over a pulley 69 and directed downwardly (Fig. 4), where its opposite end 70 is fixed to a heavy arm 71 carrying an adjustable weight 72. The weighted arm 71 may be pivoted at 73 to the machine frame, and weight 72 may be fixed anywhere upon the arm by means of thumb-screw 172. From the foregoing it will be understood that the weighted arm 71, through the intermediary of cable 67, acts constantly to keep the cable tensioned so that the motor carriage 34 is constantly urged toward the mandrel 24, Fig. 2. However, the carriage shifter arm 59 opposes such advancement of the motor carriage as long as its follower 58 is on the high point or toe of cam 54, as shown in Fig. 2.

Upon rotation of cam 54, its follower 58 will be led to take a position at the heel of the cam, as indicated upon Fig. 6, this permitting the weighted arm 71 to draw cable 67 forwardly to advance the carriage 34 and the scrubber 25 carried thereby. The weight of arm 71 acting upon cable 67 and the carriage shifter 59 attached thereto, keeps the follower 58 always in contact with the periphery of cam 54.

As will be obvious, a suitable spring may be substituted for the weighted arm 71, to actuate the motor carriage 34, and such modification of structure is to be comprehended within the purview of the invention.

The third rotary cam, indicated at 55, controls the operation of a pan kicker or device to displace the pan from the mandrel 24 upon completion of the scrubbing operation. This cam 55, as best shown upon Fig. 10, carries a peripheral projection 74 to strike a cam follower 75 mounted upon an arm 76, which arm at 77 is fixed to a rock shaft 78. Also fixed to the rock shaft is a yoke arm 79 adapted to be swung momentarily in the direction of the arrow, Fig. 10, for sharply advancing a kick plate 84 lengthwise toward the free end of mandrel 24, to dislodge a pan therefrom. Arm 79 carries a yoke 81 within which the kick plate is suspended upon pivot pins 82 or equivalent means. From the foregoing, it will readily be understood that with each complete rotation of cam 55, the kicker or pan displacing device will be actuated for dislodging a pan from mandrel 24 as the final step in the operating sequence of the pan scrubbing apparatus. Rock shaft 78 is, of course, mounted upon a stationary frame member of the apparatus.

The cams 44, 54, and 55 are fixedly secured upon cam shaft 53, and the shaft may be driven in any suitable manner at a relatively slow speed. One form of drive for the cam shaft is suggested by Figs. 2 and 4, wherein 84 indicates the cam shaft drive motor transmitting motion to a speed reducing gear box 85 from which extends the cam shaft 53, through the intermediary of a belt drive 86. Motor 84 may be mounted upon a stationary frame member 87. One complete rotation of the cam shaft initiates a complete operating sequence of the machine, as will be explained.

As was previously pointed out herein, the mandrel 24 is adapted to be rotated preferably in a direction opposite to the direction of rotation of scrubber 25, and at a somewhat slower rate. Means for rotating the mandrel may comprise an electric motor 89 and suitable speed reducing gear, for example, a train of pulleys and belts 90, 91, 92, 93, 94 and 95, driving the shaft 96 of mandrel 24. Shaft 96 preferably is inclined downwardly in the direction of mandrel 24, for the purpose of encouraging drainage of fluid and foreign particles from the pan during the scrubbing process. A suitable drainage angle for the pan is suggested by Fig. 5 of the drawings. Fig. 1 shows bearings at 97, 98 for the support of the inclined shaft 96, the bearings being fixed relative to the machine frame.

As long as motor 89 remains energized, the shaft 96 and mandrel 24 on the end of said shaft will continue rotating. Pans carried by the mandrel may be dislodged by the kicker 80 while the mandrel rotates, and other pans may be frictionally applied to the mandrel without stopping rotation of the mandrel and shaft 96. It may here be noted that the mandrel, tapered in correspondency with the taper of the pan tube 21, carries friction means on its exterior surface to grip the inside wall of the tube so as to furnish a non-slip connection inducing rotation of the pan with the mandrel. One form of friction means suitable for the purpose is illustrated by Fig. 11, wherein is shown a plurality of resilient ribs 99 embedded or keyed into the material of the mandrel and extending lengthwise thereof. The resilient ribs project radially from the mandrel to frictionally engage the inner surface of the pan tube. The ribs may be of rubber or rubber-like material, by preference, although any suitable means may be employed to releasably hold the pan on the mandrel during the scrubbing process.

Figure 3:
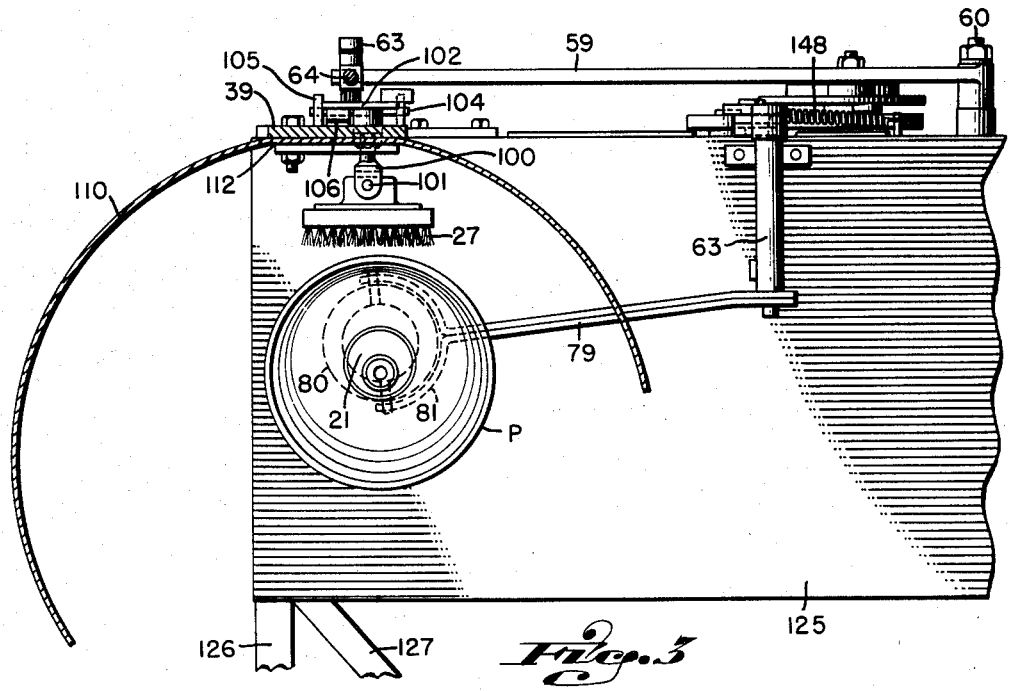
Fig. 3 is a fragmentary cross-sectional view taken on line 3—3 of Fig. 2, and showing a baking pan in position to be scrubbed.

It was previously mentioned that the apparatus includes a scrubber or brush 27 for scouring the outside wall of a bake pan while brush 25 scrubs the inside of the pan. Figs. 2, 3 and 11 illustrate means whereby the outside scrubber 27 may be brought into contact with the pan exterior, coincidentally with advancement of the rotary scrubber 25 into the pan interior, while the pan rotates with mandrel 24. Brush or scrubber 27 may be substantially flat, or arcuate if desired, and may depend from a hanger 100 with the aid of a clevis pin 101 or the like. As best illustrated in Figs. 1, 3 and 11, the hanger 100 is fixed securely to a tiltable arm 102, and depends therefrom through an aperture 103 in the beam 39. Arm 102 has a pivotal mounting at 104 upon a bracket 105 upstanding upon the beam, and said arm is normally kept elevated at the brush-supporting end, by means of a spring or the like 106 which is shown upon the drawings as a leaf spring, by way of example. The tilting arm 102 may be depressed at the brush-supporting end, against the resistance of spring 106, to place the brush 27 in contact with the exterior wall of a pan supported upon mandrel 24.

Means for lowering the brush 27 into contact with the exterior wall of a pan, may comprise a camming device operative incident to advancement of carriage 34 toward the mandrel. It may consist of an inclined projection 107 on the swinging end of arm 102, adapted to be struck by an oppositely inclined projection 108 on carriage 34, so that upon advancement of the carriage along track 35 toward the mandrel 24, the inclined projection 108 on the carriage will override the inclined projection 107 of arm 102, thereby to depress said arm and the brush 27 carried thereby, to a lowered position at which the brush will contact a pan carried by the mandrel. Brush 27 will remain lowered against the rotating pan as long as carriage 34 is in the advanced position. Upon retraction of the carriage to the home position of Fig. 1, the leaf spring 106 will act to elevate arm 102 and brush 27 thereto attached.

Fig. 3 shows a cylindrical splash guard 110 which may be applied to the machine if desired, for confining any fluid that may be thrown from the rotating pan P during the scrubbing operation. The guard may substantially surround the pan, and may be mounted either upon the machine frame or upon the beam 39, the latter mounting being indicated at 112 by way of example.

In the modification illustrated by Figs. 12 and 13, there is shown a form of mandrel or holder 113 on shaft 96, for frictionally retaining a tubeless type pan S to be scrubbed. The holder may be in the form of a cup flared outwardly in substantial conformity with the pan taper, and adapted to receive the pan therein, Fig. 12. Inside the holder is a plurality of fixed ribs or inserts 114, preferably of rubber or rubber-like friction material, arranged to releasably hold the pan within the cup by frictional contact with the side of the pan. The cup may include a central bored hub 115 pinned or otherwise secured to rotary shaft 96, as at 116.

When the machine is equipped for cleaning the tubeless type of pan, the operator may replace the rotary inside brush 25 with one larger in size, and shaped advantageously to clean the larger bottom of the tubeless form of pan.

Figs. 14 and 15 show a modification of the mounting for a brush similar to 27 of Fig. 11. In the modification, brush 270 is yieldingly supported within a holder 117 which embraces springs 118 tending constantly to advance the brush against the exterior wall of a pan undergoing scrubbing. The pan may be either a tube pan or a tubeless one. Springs such as 118 may press upon the brush back 119, while under compression between the brush back and the top wall 120 of holder 117. To limit the extensile movement of the brush, the holder may be provided with suitable stop means which may take the form of inturned flanges 121 at opposite sides of the brush holder. As disclosed, the brush holder may include one or more adjustable hangers 122 for suspending the brush assembly from the beam 39 of the apparatus.

With reference now to Fig. 1, the character 125 indicates a cover or panel assembly provided for the purpose of concealing and protecting the mechanism located within the upper portion of the machine frame. The lower portion 126 of the frame may be open as shown, and will preferably include reinforcing trusses or braces 127. The entire frame may rest upon a flat base 128.

As was previously pointed out, the slide rails or track structure 35 supporting the motor carriage 34 and rotary brush 25, projects from the horizontally shiftable beam 39 at the location 38. Due to the weight of motor 29 and carriage assembly 34, it may be desirable to provide an auxiliary support therefor, which may comprise an upright rod or bar 129 resting upon base 128 and having connection with the rail or track structure at 130. Rod or bar 129 quite obviously will furnish support for the overhanging end of the track structure, thus relieving the connection at 38 from considerable strain, while at the same time removing a weight burden from beam 39 so that the beam more easily may be rocked horizontally about its pivot 41.

Because the beam 39 has slight movement horizontally, the support rod or bar 129 is necessarily flexible as to its mountings at 130 and 131. These mountings, therefore, may be in the form of universal joints or swivel connectors. The rod or bar itself is rigid and substantial, but movable with the beam. The cleaning fluid supply pipe 32 may be fixed to rod 129 at the bracket 133, or to some correspondingly movable part, ensuring application of the fluid to brush 25 in all shifted positions of the beam and the brush.

The hook 134, pivoted upon the cross member 135 of the track structure which supports the carriage 34, may be used for locking the carriage against advancing movement, should such restraint of the carriage be necessary or desirable at any time. The machine may be operated with the carriage 34 restrained, because of the fact that its advance is dependent upon weight 72 which may be rendered ineffective by locking the carriage, the weight, or the connecting cable 67. The effect of latching the carriage in restraint, is to immobilize the carriage shifter arm 59 and thus remove it from the controlling influence of cam 54. Under normal operating conditions, the latch 134 is inoperative, as in Fig. 1.

Figure 16:
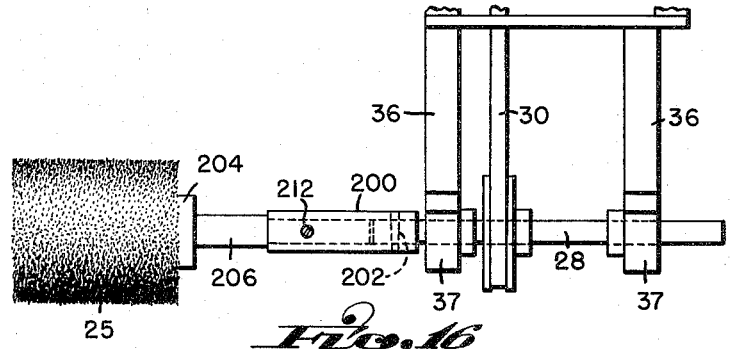
Fig. 16 is an enlarged, fragmentary detail in side elevation, of a modified form of scrubbing brush assembly illustrating the relationship of parts when a new brush has been mounted.
Figure 17:
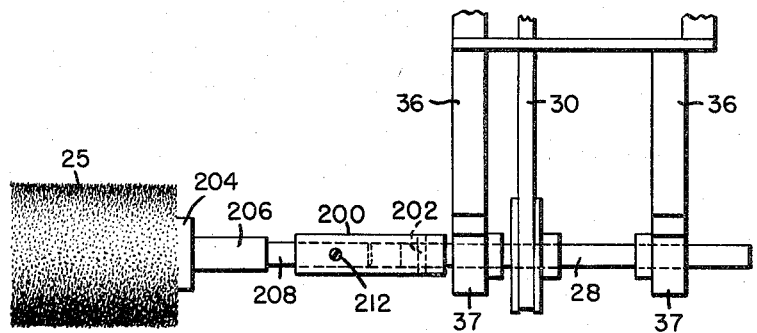
Fig. 17 is a view similar to Fig. 16 showing the brush in adjusted position to compensate for wear.
Figure 18:
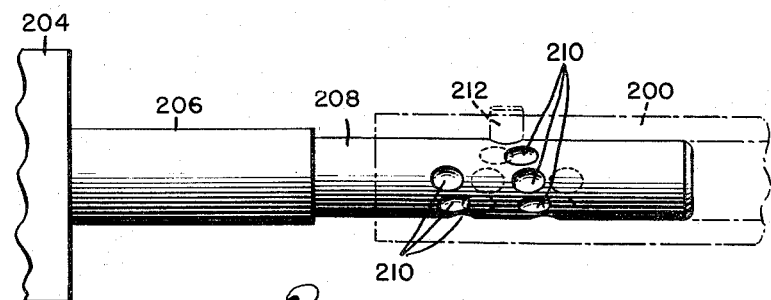
Fig. 18 is an enlarged fragmentary detail of the shank of the scrubbing brush of Figs. 16 and 17.

In Figs. 16, 17 and 18 I have illustrated a different type of scrubber brush mounting which comprises a sleeve 200 rigidly secured in driven relationship with shaft 28 by means of a pin 202. Brush 25 is provided with a base plate 204 from which shaft 206 projects, said shaft preferably having a portion 208 of reduced diameter dimensioned to be slidably received within sleeve 200. In the preferred embodiment of the invention, shaft portion 208 is provided with a series of annular depressions 210 which are spiraled around the shaft, as illustrated in Fig. 18, for providing a plurality of sockets each one of which is disposed farther from base plate 204 than the preceding socket. A set screw 212 threadably secured to and carried by sleeve 200 is adapted to engage one of sockets 210 for securely, though releasably, anchoring the brush in driven relationship with shaft 28. When it becomes necessary or desirable to advance the brush 25 forwardly to compensate for wear, all an operator need do is to loosen set screw 212 and rotate and pull outwardly for aligning the next succeeding socket with the set screw. Upon tightening the set screw, the brush will be ready for cleaning many thousands of pans.

Figure 5:
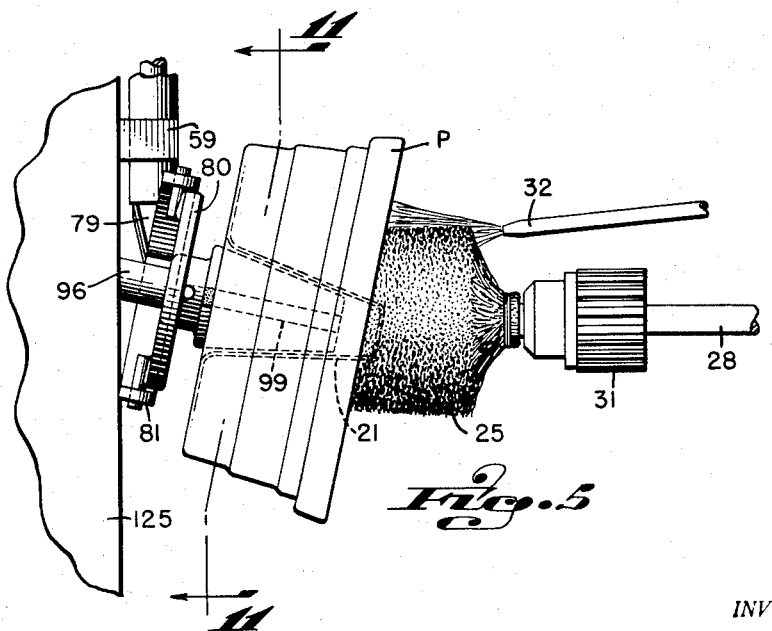
Fig. 5 is a fragmentary detail view in side elevation, showing a pan undergoing scrubbing.

The operation of the device is as follows:

Referring to Fig. 1, which shows all elements of the apparatus in initial starting position, an attendant may apply to mandrel 24 one of the pans such as P, Fig. 5. The pan is releasably held upon the mandrel by frictional contact with the resilient ribs 99.

The supply of cleaning fluid may now be turned onto the scrubber at 32, and electric current supplied to the motors 29, 84, and 89, preferably by the closing of a single control switch, not shown. Motor 29 operates solely to rotate the scrubber 25, and motor 89 operates solely to rotate the mandrel 24 with the pan attached thereto. At the same time, motor 84 drives the cluster of cams 44, 54 and 55, through the reduction gear 85, which may rotate the cam shaft at a rate approximating 10 to 20 r.p.m.

The first operation is initiated under the control of cam 54, which in rotating permits the follower 58 to move toward cam shaft 53 (Fig. 6), thereby allowing the carriage shifter arm 59 to move, under the power of weighted arm 71 and cable 67, in the direction of cable pulley 69. Since the outer end of shifter arm 59 is connected to the shiftable motor carriage 34 by the tie rod 64, the carriage will advance with the shifter arm to project the scrubber 25 into the rotating pan or mandrel 24, as depicted by Fig. 7. In this position of the scrubber 25, the scrubber bears heavily against the center tube of the pan, and also against the pan bottom, to perform a cleaning operation thereon.

Concurrently with advancement of carriage 34 as above explained, the inclined abutment 108 mounted upon the carriage, will have overrun the correspondingly inclined abutment 107 to depress the tilt arm 102 and thereby lower the exterior scrubber 27 onto the outside surface of the pan supported upon the rotating mandrel 24. Thus it will be understood that both scrubbers 25 and 27 operate upon the pan at the same time.

As cam shaft 53 (Fig. 2) continues to rotate, the toe or high point 48 of cam 44 will strike its follower 45, to shift the link 47 to the right as shown by Fig. 8, thereby slightly moving the beam 39 to the left about its pivot 41. In this position of the beam, the motor carriage 34 and brush 25 supported thereon are likewise shifted, thereby to bias the brush or scrubber 25 away from the center tube of pan P (Fig. 9), and against the side wall of the pan, to concentrate the scrubbing action upon the inside face of the pan side wall. As will be understood, this position of the brush or scrubber 25 persists until the high point 48 of the cam 44 moves past the follower 45, whereupon the follower under the influence of spring 148 returns to normal position upon cam 44 and allows beam 39 to resume the initial position of Fig. 6. This return of beam 39 to initial position restores the Fig. 7 position of brush 25, in readiness for withdrawal from the pan.

Immediately following the return of beam 39 to the initial position, cam 54 acts upon follower 58 (Fig. 2) to move the carriage shifter arm 59 toward the carriage support rails 35, 35, thereby to withdraw brush 25 from contact with the pan interior.

Figure 10:
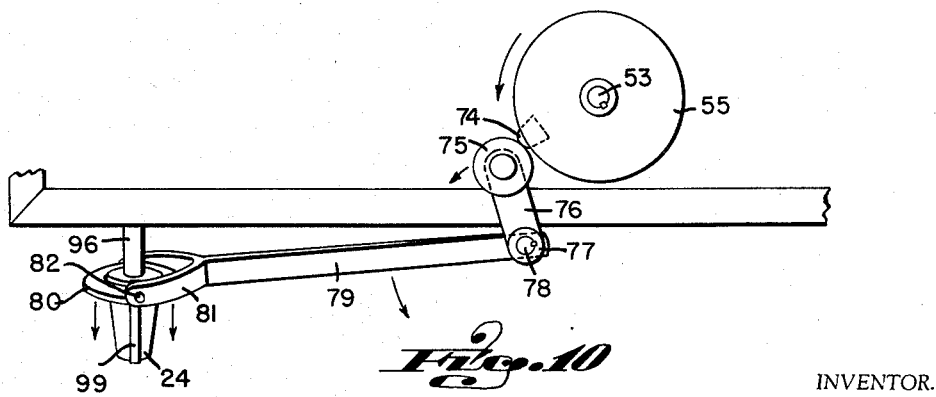
Fig. 10 is a fragmentary schematic view illustrating the parts in position to initiate a third and final step in the operating sequence.

While the carriage 34 and brush 25 are retracting as above explained, the projection 74 of cam 55 (Fig. 10) will be approaching the follower 75; and when the projection strikes the follower in accordance with Fig. 10, the pan kicker mechanism will be actuated as shown to dislodge the cleaned pan from mandrel 24. The attendant in charge of the device may then immediately place a soiled pan upon the mandrel, without stopping the machine, whereupon the entire cycle of operations will repeat automatically to clean the newly applied pan. The action of cam 54 to advance the carriage 34 and brush 25 in initiating a subsequent cycle of operations, is delayed sufficiently to afford the attendant ample time in which to apply another pan to the mandrel.

The apparatus of the invention is easy to operate, and will effectively and economically scrub bake pans at a rapid rate, with safety and convenience. If desired, the washing fluid directed to the pans by tube 32 may contain any suitable cleaning compound or detergent, which may be pumped and recirculated for repeated usage, at least to a limited extent.

The apparatus of the invention is subject to various modifications and changes in structural details, within the scope of the appended claims, without departing from the spirit of the invention.

What is claimed is:

1. Apparatus for cleaning a deep bake pan having a side wall and a central upstanding tube, said apparatus comprising a rotary mandrel for supporting the pan for rotation axially of the tube, a scrubber, means for moving said scrubber toward the pan side wall to contact and clean the exterior of the pan side wall as the pan rotates, a second scrubber, means for projecting the second scrubber into the pan between the tube and the side wall of the pan, means for shifting the second scrubber laterally between the tube and the pan side wall as the pan rotates, to successively scrub the tube and the interior of the pan side wall, and means operative subsequently to the scrubbing operation, to kick the pan bodily from the mandrel.

2. Apparatus as set forth in claim 1, wherein the second scrubber is in the form of a rotating brush disposed at an angle with respect to the mandrel.

3. Apparatus as set forth in claim 1, wherein the second scrubber is in the form of a rotating brush disposed in axially endwise adjustable relationship with the mandrel.

4. Apparatus for cleaning a deep bake pan having a side wall and a central upstanding tube, said apparatus comprising a rotary mandrel for releasably supporting the pan for rotation axially of the tube, a scrubber, means for moving said scrubber toward the pan side wall to contact and clean the exterior of the pan side wall as the pan rotates, a second scrubber, a movable carriage supporting the second scrubber for advancement and retraction into and from the pan, between the central tube and the side wall thereof, means on the carriage for rotating the second scrubber in a plane transverse to the direction of carriage movement, means operative while the second scrubber is advanced, to shift the second scrubber laterally for successively scrubbing the central tube and the inner face of the pan side wall as the pan and the second scrubber rotate, and means for dislodging the pan from the mandrel upon completion of the scrubbing operation.

5. Apparatus as set forth in claim 4, wherein the mandrel is supported for rotation at an angle to the horizontal, to maintain the pan in tilted position conducive to flow of any foreign matter from the pan while rotating.

6. Apparatus for cleaning a deep bake pan having a side wall and an upstanding central tube, said apparatus comprising a rotary mandrel for releasably supporting the pan for rotation axially of the tube, a scrubber, means for movnig said scrubber toward the pan side wall to contact and clean the exterior of the pan side wall as the pan rotates, a second scrubber, a movable carriage supporting the second scrubber for advancement and retraction into and from the pan, between the central tube and the side wall thereof, means on the carriage for rotating the second scrubber in a plane transverse to the direction of carriage movement, means operative while the second scrubber is advanced, to bodily shift the carriage laterally for placing the second scrubber alternately in contact with the central tube of the pan, and the inner face of the pan side wall, as the pan and the second scrubber rotate, and means for dislodging the pan from the mandrel upon completion of the scrubbing operation.

7. Apparatus as set forth in claim 6 wherein the combination includes positive power means for retracting the movable carriage, and yielding means for advancing the carriage toward and into the pan undergoing cleaning, whereby advancement of the carriage may be restrained at will during and between cleaning operations.

8. Apparatus for cleaning a deep bake pan having a side wall and a central upstanding tube, said apparatus comprising a rotary mandrel for supporting the pan for rotation axially of the tube, means supporting the mandrel at an angle to the horizontal, for maintaining the pan in tilted position conducive to flow of any foreign matter from the pan while rotating, a scrubber, means for moving said scrubber toward the pan side wall to contact and clean the exterior of the pan side wall as the pan rotates, a second scrubber, means for projecting the second scrubber into the pan between the tube and the side wall of the pan, means for shifting the second scrubber laterally between the tube and the pan side wall as the pan rotates, to successively scrub the tube and the interior of the pan side wall, and means operative subsequently to the scrubbing operation, to dislodge the pan bodily from the mandrel.

9. Apparatus as set forth in claim 8, wherein the means for projecting the second scrubber is yieldable in character and capable of being restrained and manually reversed in direction during the scrubbing operation.

10. Apparatus for cleaning a deep bake pan having a side wall and a central upstanding tube, said apparatus comprising a rotary mandrel for releasably supporting the pan for rotation axially of the tube, a rotary scrubber, a movable carriage supporting the scrubber for advancement and retraction into and from the pan, between the central tube and the side wall of the pan, cam-controlled means for advancing and retracting said carriage, cam-controlled means operative while the carriage is advanced, to shift the carriage and scrubber laterally for successively scrubbing the central tube and the inner face of the pan side wall, cam-controlled means for dislodging the pan from the mandrel upon each retractile movement of the carriage, and a single motor-driven camshaft sequentially actuating all of said cam-controlled means.

11. Apparatus of the class described comprising in combination, an upright frame having a top, a rotating mandrel extending laterally from the frame for supporting a pan, a beam pivoted at one end to the top of the frame for horizontal swinging movement transversely of the mandrel, an extension on the free end of the beam including a track projecting beyond the mandrel, a carriage slidable lengthwise of the track, a shaft rotatably supported by the carriage and having an end projecting toward the mandrel, a brush on said shaft end, and means including a motor on the carriage for rotating said shaft and the brush carried thereby, a driven camshaft journaled for rotation at the top of the frame, a cluster of cams fixed upon the camshaft, means associated with one of the cams for reciprocating the carriage toward and from the mandrel, means associated with another of said cams for rocking the beam horizontally about its pivoted end and thereby imparting lateral movement to the shaft carrying the brush, means associated with a third cam of the cluster for dislodging a pan from the mandrel, and a motor on the frame for rotating the camshaft and the cams fixed thereon.

12. Apparatus as set forth in claim 11, wherein the combination includes a second brush disposed in laterally spaced relationship to the mandrel, a movable support for said second brush, and cooperative means on said movable support and the slidable carriage aforesaid, operative upon movement of the carriage toward the mandrel to advance the second brush laterally toward the mandrel.

13. Apparatus as set forth in claim 11, wherein the rotating mandrel is inclined downwardly from the top of the frame and generally toward the rotatable brush on the carriage, the shaft of said rotatable brush being out of alignment with and offset relative to the axis of rotation of the mandrel.

14. Apparatus for cleaning a deep bake pan having a side wall and a bottom, said apparatus comprising a rotary mandrel for supporting the pan for rotation concentrically with the side wall thereof, a scrubber, means for moving said scrubber toward the pan side wall to contact and clean the exterior of the pan side wall as the pan rotates, a second scrubber, and means for advancing and retracting the second scrubber toward and from the pan bottom, and in contact with the inner face of the pan side wall, as the pan rotates with the mandrel.

15. Apparatus as set forth in claim 14, wherein the second scrubber is in the form of a rotating brush disposed at an angle with respect to the mandrel.

16. Apparatus for cleaning a deep bake pan having a side wall and a bottom, said apparatus comprising a rotary mandrel for supporting the pan for rotation concentrically with the side wall thereof, a scrubber, means for moving said scrubber toward the pan side wall to contact and clean the exterior of the pan side wall as the pan rotates, a second scrubber, a movable carriage supporting the second scrubber for advancement and retraction into and from the pan interior, means on the carriage for rotating the second scrubber in a plane transverse to the direction of carriage movement, positive power means for retracting the movable carriage, and yielding means for advancing the carriage toward and into the pan undergoing cleaning, whereby advancement of the carriage may be restrained at will during and between cleaning operations.

17. Apparatus as set forth in claim 16, wherein the combination includes means operative upon each retracile movement of the carriage, to dislodge a pan bodily from the mandrel.

18. Apparatus for cleaning a circular bake pan having a side wall and a bottom, said apparatus comprising a rotary mandrel for supporting the pan for rotation concentrically with the side wall thereof, with the pan bottom transverse to the rotation axis of the mandrel, means supporting the mandrel at an angle to the horizontal, for maintaining the pan in tilted position conducive to flow of any foreign matter from the pan while rotating, a scrubber for the interior of the pan, and means for advancing and retracting the scrubber relative to the pan bottom and in contact with the inner face of the pan side wall, as the pan rotates with the mandrel.

19. Apparatus as set forth in claim 18, wherein said mandrel includes friction means for engaging the pan whereby the pan is releasably supported by the mandrel, and the combination includes means operative after predetermined scrubbing of the pan, to dislodge the pan bodily from the mandrel.

References Cited in the file of this patent

UNITED STATES PATENTS

| | | |
|---|---|---|
| 1,302,481 | Spruch | Apr. 29, 1919 |
| 2,239,047 | Mathiessen | Apr. 22, 1941 |
| 2,274,309 | Velton | Feb. 24, 1942 |

FOREIGN PATENTS

| | | |
|---|---|---|
| 62,890 | France | Feb. 16, 1955 |
| 64,692 | France | June 29, 1955 |